J. H. McCOLLOUGH, JR.
AUTOMOBILE SEAT.
APPLICATION FILED SEPT. 27, 1921.
Reissued July 4, 1922. 15,396.
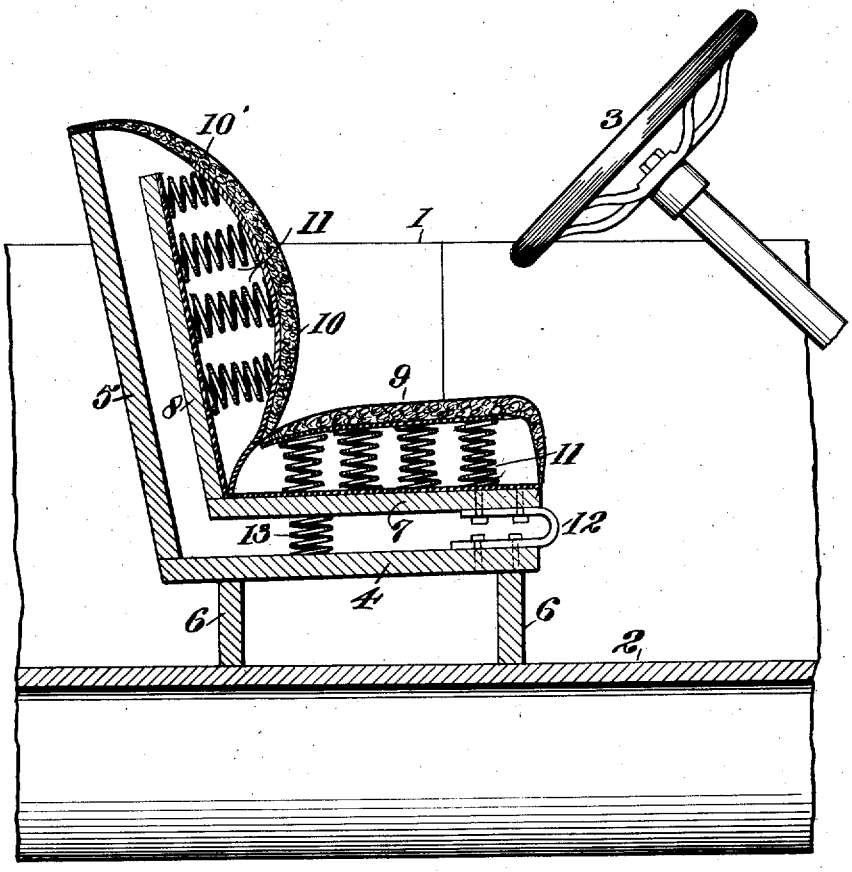
Inventor.
James H. McCullough Jr
By Boark & Boark
attorneys

UNITED STATES PATENT OFFICE.

JAMES H. McCOLLOUGH, JR., OF SAN JOSE, CALIFORNIA.

AUTOMOBILE SEAT.

15,396. Specification of Reissued Letters Patent. Reissued July 4, 1922.

Original No. 1,379,270, dated May 24, 1921, Serial No. 362,508, filed March 1, 1920. Application for reissue filed September 27, 1921. Serial No. 503,616.

*To all whom it may concern:*

Be it known that I, JAMES H. McCOLLOUGH, Jr., a citizen of the United States, residing at San Jose, in the county of Santa Clara and State of California, have invented certain new and useful Improvements in Automobile Seats, of which the following is a specification.

My invention relates to the class of automobile seats.

These seats, as ordinarily constructed, are upholstered with resilient cushions mounted upon a solid or fixed frame, the shocks or vibrations being absorbed by the springs of the cushions. To minimize these shocks or vibrations as much as possible, care is taken to provide not only the bottom cushion with long and resilient springs, but also to furnish the back cushion with such easy springs also, thereby recognizing that the shocks reach the occupant of the seat through both cushions. But while the human body is able to sustain with minimum discomfort and injury the relatively vertically directed shocks such as are transmitted through the bottom cushion, it is not adapted as well for sustaining the shocks transmitted through the back cushion, the effect of these latter shocks being comparable to that which would be produced if while one is seated in a chair, another should grasp him by the shoulders and forcibly shake him back and forth. It, therefore, happens that due to these back shocks, transmitted through the back cushion, there results a condition of fatigue, principally in the muscles of the shoulders and neck, since these parts are subjected to the most continuous strain.

The object of my invention is to provide an automobile seat which while adapted for the use of the most luxurious and approved upholstered cushions, is capable of practically eliminating the shocks which would otherwise reach the occupant through the back cushion.

To this end my invention consists in the novel automobile-seat which I shall hereinafter fully describe, by reference to the accompanying drawing in which one form of my invention is illustrated, though it will be understood that changes in form and arrangement may be had without affecting the essential nature and effect of the invention as defined by the appended claims.

In the drawings, the figure is a vertical cross section of my improved automobile-seat.

1 indicates a fragmentary portion of the body of an automobile, 2 its floor and 3 its steering wheel. In the illustration of the seat as here given which indicates a practicable though not an essential arrangement and form, there is a fixed frame composed of a bottom portion 4 and a back portion 5, said frame being supported from the floor of the automobile by the uprights 6. There is also a second frame similarly composed of a bottom portion 7 and a back portion 8, the two portions forming a rigid L-shaped frame. The second frame is nested within but spaced from the fixed frame.

9 is a bottom cushion and 10 is a back cushion, the form of cushions here shown being the usual type of spring cushions, the springs being indicated by 11. These cushions are carried by the second frame, but, in order to conform to customary general style and appearance the upholstery of the back cushion 10, as shown at 10′, is carried over and free of the top edge of the back portion of the second frame and is attached to the top edge of the back portion of the fixed frame, thus inclosing and concealing the second frame.

The second frame is connected with the fixed frame preferably though not necessarily at the forward edge of the bottom portions of both by a horizontally directed yieldable joint, which in its best form is a bendable U-strap 12 adapted while affording some support to the second frame, to still yield in its bight under the independent movements of said frame. This form of yielding or hinge movement though slight is sufficient for the purpose. Between the two frames and controlling the relative movement of the second frame is a resilient member, here shown as a spring 13. In its best position it lies between the two bottom portions of the frames, as shown, as in this position it may be of effective strength and yet sensitive to the long leverage of the back portion of the second frame.

It will now be seen that the shocks and vibrations transmitted through the fixed frame will be almost wholly absorbed by the spring 13, the second frame being capable of yielding as a rigid unit about its hinge connection at 12. On account of said hinge connection, the substantially horizontal shocks and vibrations of the fixed frame will produce practically nothing but vertical movements of the second frame, very much lessened in intensity, and as hereinbefore stated this conversion of direction will result in avoiding the fatigue occasioned by occupying the seat for a long time while the vehicle is in motion.

I claim:—

1. An automobile seat, comprising a fixed frame with bottom and back; a second frame with bottom and back nested in and spaced from the fixed frame; a bendable U-strap connection between the forward edges of the two frames forming a horizontally disposed yielding joint therebetween; and a resilient member between said frames rearwardly of said connection.

2. An automobile seat, comprising a fixed frame with bottom and back; a second frame with bottom and back nested in and spaced from the fixed frame; a bendable U-strap connection between the forward edges of the two frames forming a horizontally disposed yielding joint therebetween; and a resilient member between the bottoms of said frames.

3. An automobile seat comprising a fixed frame with bottom and back; a second frame, with bottom and back nested in and spaced from the fixed frame, the back of said second frame terminating below the upper edge of the back of the fixed frame; a horizontally disposed joint connection between the forward edges of the two frames; a resilient member between the two frames rearwardly of the hinge connection; a seat cushion carried by the bottom of the second frame; a back cushion having its covering extending continuously from the lower edge of the back of the second frame to the top of the back of the fixed frame, said covering being spaced from the upper edge of the back of said second frame; and cushion springs interposed between the back of the second frame and said covering.

4. An automobile seat comprising a fixed bottom and back; a rigid L-shaped seat frame nested in and spaced from the fixed bottom and back; a connection between the bottom of the seat frame and the fixed bottom adapting the seat frame for oscillation about a horizontal axis; means for limiting the extent of said oscillation; a seat cushion carried by the bottom of the seat-frame, and a back cushion having its covering extending from the lower part of the back to the seat-frame over the top thereof and secured to the fixed back.

5. An automobile seat comprising a fixed bottom and back; a rigid L-shaped seat-frame nested in and spaced from the fixed bottom and back; a horizontally disposed yielding joint connection between the fixed bottom and the bottom of the seat-frame; a resilient member between the two bottoms; a seat cushion carried by the bottom of the seat-frame and a back cushion carried by the back of said seat-frame, having its covering extending over the top thereof and secured to the fixed back.

6. An automobile seat comprising a fixed bottom and back; a rigid L-shaped seat-frame nested in and spaced from the fixed bottom and back; a horizontally disposed yielding joint connection between the fixed bottom and the bottom of the seat-frame; a resilient member between the two bottoms rearwardly of the joint connection; a seat cushion carried by the bottom of the seat-frame and a back cushion carried by the back of said seat-frame, having its covering extending over the top thereof and secured to the fixed back.

In testimony whereof I have signed my name to this specification.

JAMES H. McCOLLOUGH, Jr.